US012621878B2

(12) United States Patent
Chen

(10) Patent No.: US 12,621,878 B2
(45) Date of Patent: May 5, 2026

(54) PAIRING CONNECTION METHOD AND APPARATUS, AND STORAGE MEDIUM

(71) Applicant: BEIJING XIAOMI MOBILE SOFTWARE CO., LTD., Beijing (CN)

(72) Inventor: Lei Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 251 days.

(21) Appl. No.: 18/240,623

(22) Filed: Aug. 31, 2023

(65) Prior Publication Data

US 2024/0373480 A1 Nov. 7, 2024

(30) Foreign Application Priority Data

May 5, 2023 (CN) .......................... 202310499627.5

(51) Int. Cl.
*H04W 76/10* (2018.01)
*H04W 12/06* (2021.01)

(52) U.S. Cl.
CPC ........... *H04W 76/10* (2018.02); *H04W 12/06* (2013.01)

(58) Field of Classification Search
CPC ....... H04W 4/80; H04W 76/10; H04W 76/14; H04W 12/06; H04W 12/062
See application file for complete search history.

(56) References Cited

U.S. PATENT DOCUMENTS

| | | | | |
|---|---|---|---|---|
| 2011/0281519 A1* | 11/2011 | Reuss | ................... | H04W 8/005 |
| | | | | 455/41.2 |
| 2014/0323048 A1* | 10/2014 | Kang | ...................... | H04W 4/80 |
| | | | | 455/41.2 |
| 2016/0014545 A1 | 1/2016 | Tian et al. | | |
| 2016/0028726 A1* | 1/2016 | Matthews | ............. | H04L 63/083 |
| | | | | 726/5 |
| 2016/0278137 A1* | 9/2016 | Oguchi | ................... | H04W 4/80 |
| 2017/0078300 A1 | 3/2017 | He et al. | | |
| 2022/0095419 A1 | 3/2022 | Park et al. | | |
| 2023/0051956 A1 | 2/2023 | Wallach | | |
| 2023/0403749 A1* | 12/2023 | Lu | .......................... | H04L 9/0637 |
| 2024/0163941 A1* | 5/2024 | Li | ........................ | H04L 63/0853 |

OTHER PUBLICATIONS

Extended European Search Report of EP Application No. 23196508.8 dated Nov. 29, 2023, (9p).

* cited by examiner

*Primary Examiner* — Wen W Huang

(74) *Attorney, Agent, or Firm* — Arch & Lake LLP; Hao Tan; Shen Wang

(57) ABSTRACT

A pairing connection method is applied to a first device, and the pairing connection method includes: in response to determining that the first device is triggered to make a pairing connection with a second device, acquiring device information of the second device, and authenticating the second device based on the device information of the second device; in response to that authentication of the second device is passed, obtaining pairing connection service information that matches the second device from pre-stored service information for pairing connection; and pairing with the second device based on the pairing connection service information.

13 Claims, 6 Drawing Sheets

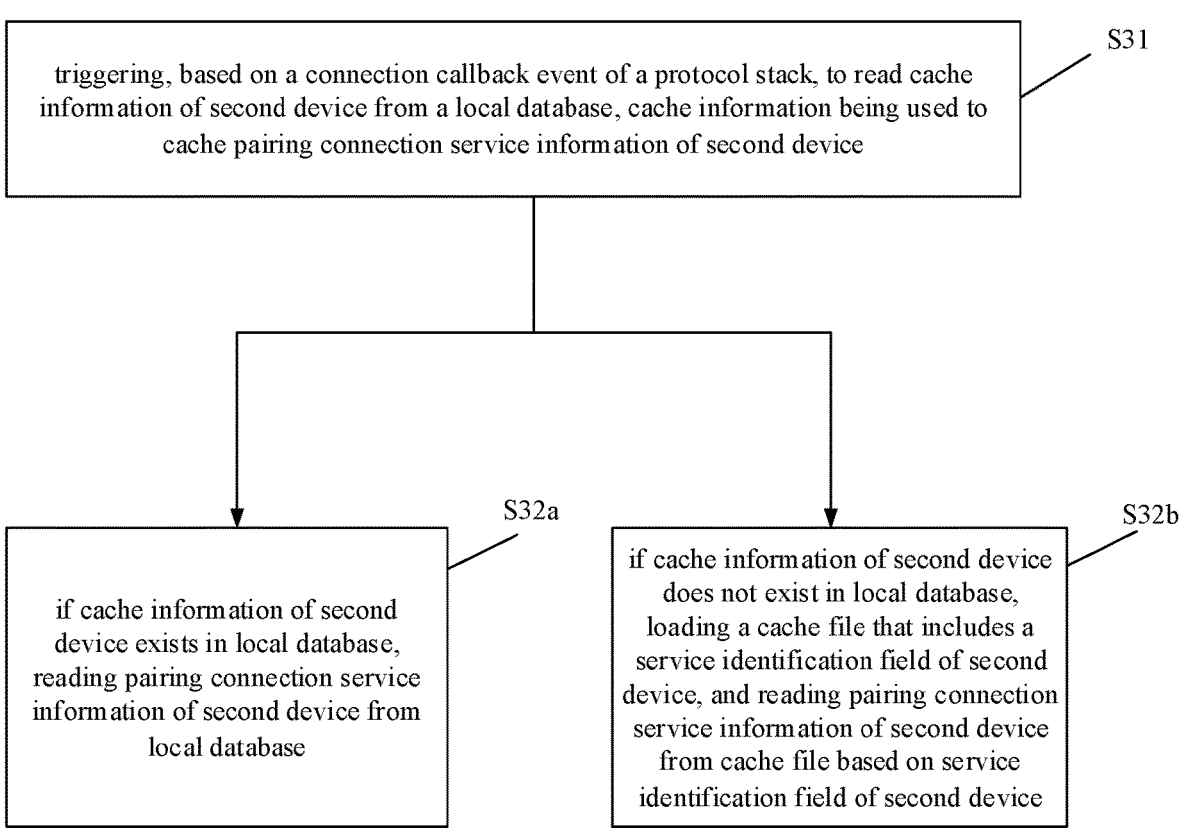

triggering, based on a connection callback event of a protocol stack, to read cache information of second device from a local database, cache information being used to cache pairing connection service information of second device

S31 if cache information of second device exists in local database, reading pairing connection service information of second device from local database S32a if cache information of second device does not exist in local database, loading a cache file that includes a service identification field of second device, and reading pairing connection service information of second device from cache file based on service identification field of second device S32b

FIG. 3

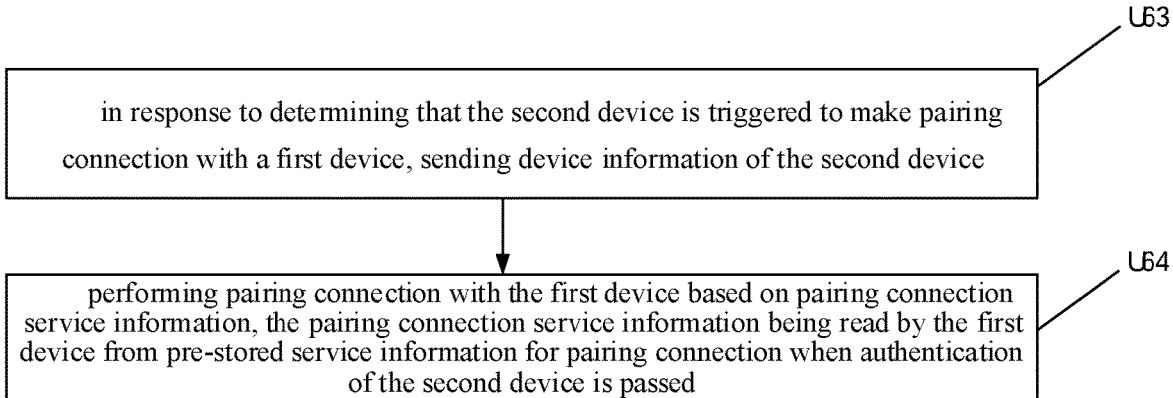

in response to determining that the second device is triggered to make pairing connection with a first device, sending device information of the second device

S63 performing pairing connection with the first device based on pairing connection service information, the pairing connection service information being read by the first device from pre-stored service information for pairing connection when authentication of the second device is passed

PAIRING CONNECTION METHOD AND APPARATUS, AND STORAGE MEDIUM

CROSS-REFERENCE TO RELATED APPLICATION

This application is based on and claims priority to Chinese Patent Application No. 202310499627.5 filed on May 5, 2023, the disclosure of which is hereby incorporated by reference in its entirety for all purposes.

BACKGROUND

With the development of Bluetooth communication technology, pairing connection technology comes into our daily life with its own advantages. There are also greater demands and more application scenarios for the pairing connection. For example, it is applied in the scenario of pairing connection of the Bluetooth Low Energy (BLE) Human Machine Interface device.

SUMMARY

The present disclosure relates to the field of Bluetooth communication technology, and more specifically, to a pairing connection method and apparatus, and a storage medium. In order to overcome the problems existing in the related technologies, the present disclosure provides a pairing connection method and apparatus, and a storage medium.

According to a first aspect of embodiments of the present disclosure, there is provided a pairing connection method, applied to a first device, the method including: in response to determining that the first device is triggered to make a pairing connection with a second device, acquiring device information of the second device, and authenticating the second device based on the device information of the second device; in response to that authentication of the second device is passed, obtaining pairing connection service information that matches the second device from pre-stored service information for pairing connection; and pairing with the second device based on the pairing connection service information.

According to a second aspect of embodiments of the present disclosure, there is provided a pairing connection method, applied to a second device, the method including: in response to determining that the second device is triggered to make pairing connection with a first device, sending device information of the second device; and pairing with the first device based on pairing connection service information, the pairing connection service information being obtain by the first device from pre-stored service information for pairing connection when authentication of the second device is passed.

According to a third aspect of embodiments of the present disclosure, there is provided a pairing connection apparatus, applied to a first device, the apparatus including: a processing unit configured to, in response to determining that the first device is triggered to make a paring connection with a second device, acquire device information of the second device, and authenticate the second device based on the device information of the second device; and in response to that authentication of the second device is passed, obtain pairing connection service information that matches the second device from pre-stored service information for pairing connection; and a connecting unit configured to pair with the second device based on the pairing connection service information.

According to a fourth aspect of embodiments of the present disclosure, there is provided a pairing connection apparatus, applied to a second device, the apparatus including: a sending unit configured to, in response to determining that the second device is triggered to make pairing connection with a first device, send device information of the second device; and a connecting unit configured to perform pairing connection with the first device based on pairing connection service information, the pairing connection service information being obtain by the first device from pre-stored service information for pairing connection when authentication of the second device is passed.

According to a fifth aspect of the present disclosure, there is provided a pairing connection apparatus, including: a processor; a memory for storing instructions executable by the processor; where the processor is configured to implement the method in the first aspect or any embodiment of the first aspect described above.

According to a sixth aspect of the present disclosure, there is provided a pairing connection apparatus, including: a processor; a memory for storing instructions executable by the processor; where the processor is configured to implement the method in the second aspect or any embodiment of the second aspect described above.

According to a seventh aspect of the present disclosure, there is provided a storage medium, where instructions are stored in the storage medium, a first device is enabled to execute the pairing connection method in the first aspect or any embodiment of the first aspect described above when the instructions are executed by a processor of the first device.

According to an eighth aspect of the present disclosure, there is provided a storage medium, where instructions are stored in the storage medium, a second device is enabled to execute the pairing connection method in the second aspect or any embodiment of the second aspect described above when the instructions are executed by a processor of the second device.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

FIG. 3 is a flowchart of a method for reading pairing connection service information of a second device from pre-stored service information for pairing connection shown according to an exemplary embodiment.

FIG. 4 is a flowchart of a pairing connection method shown according to an exemplary embodiment.

DETAILED DESCRIPTION

Figure 1:
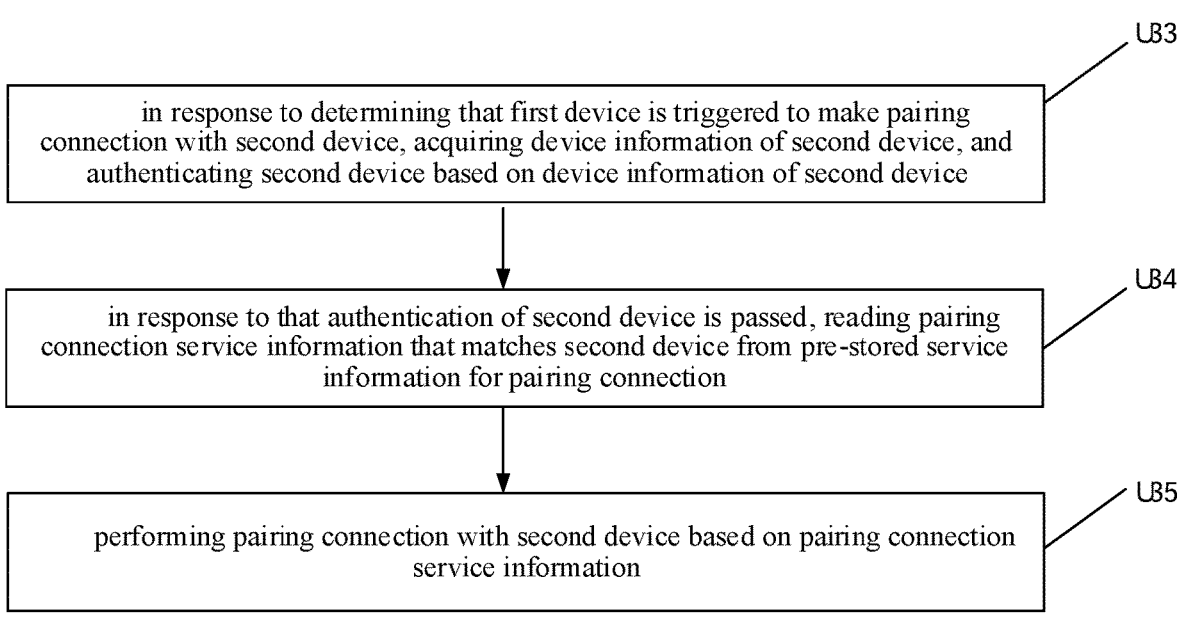
FIG. 1 is a flowchart of a pairing connection method shown according to an exemplary embodiment.

Description will now be made in detail to exemplary embodiments, examples of which are illustrated in the accompanying drawings. The following description refers to the accompanying drawings in which the same numbers in different drawings represent the same or similar elements unless otherwise indicated. The implementations in the following description of exemplary embodiments do not represent all implementations consistent with the present disclosure.

The Bluetooth Low Energy devices include a stylus, a keyboard, etc. At present, the first connection speed of pairing connection of the Bluetooth Low Energy Human Machine Interface device is slow and the power consumption is high, which affects the user's experience of pairing connection.

The pairing connection method provided by the embodiments of the present disclosure is applied to the scenario of data transmission of pairing connection for devices. For example, it is applied in the scenario of pairing connection of the Bluetooth Low Energy (BLE) Human Interface Device (HID).

HID is a commonly used device type among Universal Serial Bus (USB) devices, and it is a USB device that directly interacts with people. Among USB devices, the cost of the HID device is low. In addition, the HID device does not have to have the human machine interaction function, and any device that meets the HID category specifications is a HID device.

At present, there are two caches for BLE's HID device in Android Bluetooth: the service discovery operation can be performed during the pairing process, all the discovered situations of the services supported by the peer device can be stored in the local cache file, thereafter all the services required to be acquired can be returned from the local cache file, there is no need to make the service discovery operation to the peer device again, this is the first cache; and the HID primary service and the information it contains can be discovered when the first HID connection is made after the pairing is completed, the information obtained from the peer device can be stored in another cache file, subsequent connections can directly read from this file without making the service discovery operation to the peer device again, this is the second cache. Subsequent non-first-time connections only need to read the corresponding required information from the local cache file cached during the first connection, thereby saving time for each discovering operation to the peer device.

Therefore, the current technology is that the pairing makes the service discovery operation to the peer device during HID first connection, and all the discovered situations on the services supported by the peer device can be stored in the local cache file, and the HID primary service and the information contained therein are queried again when the pairing is completed to perform the connection, and are stored in another cache file for subsequent reading.

The first pairing connection is slower in speed and consumes a lot of power, which affects the user's experience of the pairing connection.

In view of this, the embodiments of the present disclosure provide a pairing connection method, which can be applied to the pairing connection of the Bluetooth Low Energy Human Machine Interface device. Through the present disclosure, the problems of slower speed and higher power consumption of first pairing connection can be solved, and the use experience of pairing connection of the user can be improved.

In the pairing connection method provided by the present disclosure, when a first device is made pairing connection with a second device, there is pre-cached connection information about the second device in the first device, and the matched information of the second device can be read and invoked from the local cache file of the first device for performing pairing connection at the time of connecting. Herein, what is pre-stored in the first device is the connection information of the trusted second device, and the first device needs to authenticate and confirm the second device according to the information sent by the second device and thereafter executes the connection process.

Herein, two devices that need to be paired and connected are called the first device and the second device. The first device has the functions of processing and storing, and the second device is the device that needs pairing connection. The second device may also be called as an auxiliary device. For the convenience of description, the device with the processing and storing functions is called the first device, and the device that needs pairing connection is called the second device. For example, the first device is a terminal and the second device is a stylus.

The first device confirms to trigger the pairing connection with the second device, acquires the device information of the second device, authenticates based on the information of the second device, reads the connection information that matches the second device from the cache file pre-cached by the first device, and connects with the second device based on the pairing connection information, to complete the pairing connection process.

FIG. 1 is a flowchart of a pairing connection method shown according to an exemplary embodiment. As shown in FIG. 1, the pairing connection method is applied to a terminal and includes the following steps.

In step S11, in response to determining that a first device is triggered to make a paring connection with a second device, device information of the second device is acquired, and the second device is authenticated based on the device information of the second device.

In an example, when the first device is triggered, it means that the first device and the second device trigger the unconscious data interaction behavior through the magnetic attraction at a fixed position, and the user does not need to do other operations to confirm the pairing connection with the second device.

Herein, the device information of the second device includes, but not limited to, a model, a type and a version number of the second device.

In an example, acquiring the device information of the second device can be understood as including, but not limited to, acquiring the device information of the second device through the broadcast information of the second device.

Herein, the first device authenticates the second device based on the device information of the second device can be understood as that the first device has recognized the identification information of the second device, and authenticates and confirms that it is the second device.

In step S12, in response to that authentication of the second device is passed, pairing connection service information that matches the second device is read from pre-stored service information for pairing connection.

In step S13, the pairing connection is performed with the second device based on the pairing connection service information.

Herein, the connection service information can be understood as the functional service information of a handwriting function, an electricity report, a customization function, etc.

In an example, the pairing connection information that matches the second device read from the pre-stored service information for pairing refers to the pre-matched related service information about the second device in the first device, the related information can be directly read and invoked if the authentication is passed and completed, there is no need to discover and confirm the related information of the peer terminal, that is, the second device.

In an example, the first device confirms the connection of related configuration files through the interactive data of the pairing connection service information, such that the first device establishes communication connection with the second device, and completes the whole pairing connection process.

In the pairing connection method provided in the embodiment of the present disclosure, the first device is triggered to Hereinafter, the embodiments of the present disclosure will explain the execution process of the pairing connection method involved in the above embodiments.

In the embodiments of the present disclosure, the implementation process that the first device acquires device information of the second device and authenticates the second device based on the device information of the second device is described.

Figure 2:
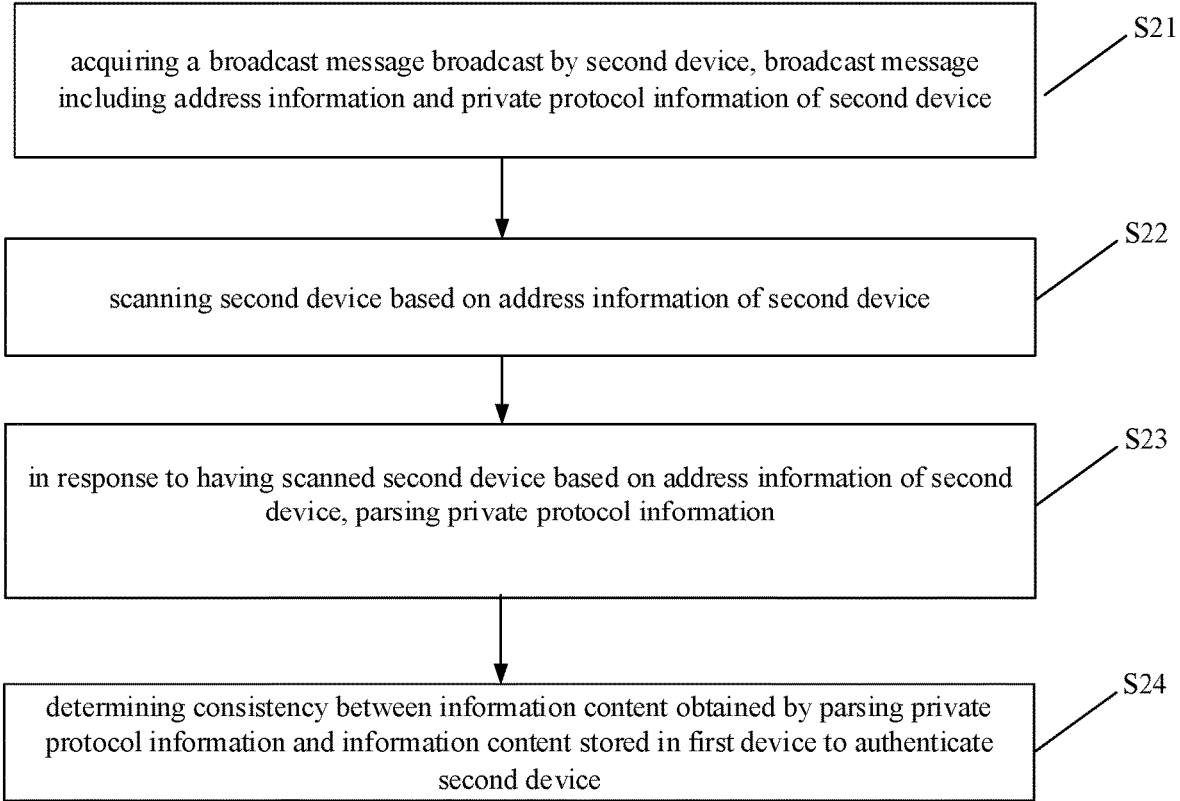
FIG. 2 is a flowchart of a method for authenticating a second device based on device information of the second device shown according to an exemplary embodiment.

FIG. 2 is a flowchart of a method for authenticating a second device based on device information of the second device shown according to an exemplary embodiment. As shown in FIG. 2, the method includes the following steps.

In step S21, a broadcast message broadcast by the second device is acquired, the broadcast message including address information and private protocol information of the second device.

Herein, acquiring the broadcast message of the second device can be understood as that the first device confirms the paring connection with the second device via being triggered. The first device acquires the device information of the second device through the broadcast message broadcast by the second device.

Herein, the private protocol information includes at least one of data content identification, second device identification, and second device version information. The content of the private protocol can be understood as identification information, and whether it is the second device is confirmed according to the private protocol information.

Herein, the content of the private protocol is shown in Table 1, for example:

TABLE 1

| Private Protocol | | | | |
|---|---|---|---|---|
| Byte | Bit | Meaning | Value | Description |
| Byte0 | ALL | Length | X | Length of broadcast field is variable based on actual length |
| Byte1 | ALL | AD Type | XX | Broadcast type is Service Data |
| Byte2 | ALL | Service UUID | XXX | UUID(0xfd2d) |
| Byte3 | ALL | | XXXX | |
| Byte4 | ALL | Length | XXXXX | Data length |
| Byte5 | ALL | Type | XXXXXX | Type is Product ID of device |
| Byte6 | ALL | Major ID | XXXXXXX XXXXXXX X | Major ID of device |
| Byte7 | ALL | | XXXXXXX XX | |
| Byte8 | ALL | Minor ID | XXXXXXX XXX | Minor ID of device |
| Byte9 | ALL | | XXXXXXX XXXX | |
| Byte10 | ALL | Length | XXXXXXX XXXXX | Data length |
| Byte11 | ALL | Type | XXXXXXX XXXXXX | Type is ATT service version number |
| Byte12 | ALL | Version | XXXXXXX XXXXXXX | ATT service version number (version number needs to change in scenarios such as service increase or decrease and content change) | make pairing connection with the second device, and the second device is authenticated according to the acquired device information broadcasted in the second device. The first device can directly read and invoke the related pairing connection information of the second device through the pre-stored service information for pairing connection after authentication of the second device is completed. The first device and the second device are connected based on the processing the confirmed pairing connection information, to complete the whole pairing connection process.

Herein, the data content identification refers to the specific data content used to identify the corresponding protocol, for example, a broadcast field length, a broadcast type, a data length, etc. For example, in Table 1, the AD Type indicates the broadcast type, and the Service UUID can be understood as the data content identification, which is used to identify the specific data content of the corresponding protocol.

The second device identification refers to the unique identification of the specific device of the second device, and a different device uses a different identification, for example, the product identification (Product ID), the major number (Major ID) and the minor number (Minor ID) in Table 1. Herein, the product identification, the major number and the minor number can be used to identify the device, that is, the second device identification mentioned above in the embodiments of the present disclosure, where the unique identification of the specific device is assigned by the same server, and the identification used by a different device is different.

The second device version information refers to the version used to identify the information in the current device that can be recognized by the first device, for example, a version type, a service version number, etc. For example, the Type in Table 1 indicates the version type, and the Version is used to identify the version of the information in the current device that can be discovered by the first device.

In an example, the broadcast content includes private protocol content, and also includes the major number and minor number of the specific device distributed by the same server and the version number of the second device's own information.

In an example, the broadcast message includes address information and private protocol information of the second device. The address information and the private protocol information are dedicated in the broadcast message of the second device, and are used to confirm the identification information of the model, the type and the version number of the second device.

In step S22, the second device is scanned based on the address information of the second device.

Herein, the first device can scan the address information of the second device, which reduces the interaction processes between the first device and the second device and reduces the power consumption to some extent when the devices are paired and connected.

In step S23, in response to having scanned the second device based on the address information of the second device, the private protocol information is parsed.

Herein, the first device can automatically identify the content in the private protocol, confirm whether it is the second device, and parse the acquired private protocol content of the related second device.

In step S24, consistency between information content obtained by parsing the private protocol information and information content stored in the first device is determined to authenticate the second device.

In an example, when the first device has scanned the broadcast of the second device, it can parse the content of the related field from the broadcast data, determines whether it is the second device and what is the version number of the information in the current device, and load a different local cache for connection according to the corresponding version number during subsequent connections.

Herein, the first device parses the private protocol content of the second device to obtain the parsed information content. The parsed information content is compared with the information content stored in the first device to confirm whether they remain consistent. The authentication is passed if the parsed information content remains consistent with the information content stored in the first device; and it is directly returned and the discovering operation is performed for pairing if the parsed information content is inconsistent with the information content stored in the first device.

For example, the first device parses the private protocol content of the second device, and obtains the parsed information content such as the model, the type and the version number of the second device. The obtained information content such as the model, the type and the version number of the second device is compared with the information content about the model, the type and the version number of the second device stored by the first device. Authentication is passed if the model, the type and the version number and so on are consistent, and it is returned directly to carry out the original discovering and pairing service for the peer device if there are differences in the model, the type, the version number etc.

In the embodiments of the present disclosure, the first device acquires device information of the second device through the broadcast message, and the device information of the second device includes address information and private protocol content. The first device scans the second device through the address information. The first device obtains the parsed information content by parsing the private protocol content. It is determined whether the parsed information content is consistent with the information content stored by the first device. The authentication is passed if the parsed information content is consistent with the information content stored in the first device. It is returned to perform the discovering and pairing service if the parsed information content is inconsistent with the information content stored by the first device. Through the present disclosure, the interaction processes between the first device and the second device are reduced, the power consumption of the devices is reduced to a certain extent, and the speed of pairing connection is improved.

In the embodiments of the present disclosure, after authentication of the second device is passed, the first device invokes the pre-stored service information about the pairing connection of the second device. The implementation process of reading the matched pairing service information of the second device by the first device from the pre-stored pairing connection service information will be described below.

FIG. 3 is a flowchart of a method for reading pairing connection service information of the second device from pre-stored service information for pairing connection shown according to an exemplary embodiment. As shown in FIG. 3, the method includes the following steps.

In step S31, it triggers, based on a connection callback event of a protocol stack, to read cache information of the second device from a local database, the cache information being used to cache the pairing connection service information of the second device.

Herein, the pairing connection service information can be understood as functional service information such as a handwriting function, a power (or electricity) report and a customization function.

Herein, the protocol stack can be understood as a sum of all layers of protocols in the network, which vividly reflects the process of file transmission in a network, from the upper protocol to the lower protocol, and then from the lower protocol to the upper protocol.

Herein, the connection callback event can be understood as a physical channel through which the second device can read the cached pairing connection information.

In step S32a, the pairing connection service information of the second device is read from the local database if the cache information of the second device exists in the local database.

In step S32b, a cache file that includes a service identification field of the second device is loaded, and the pairing connection service information of the second device is read from the cache file based on the service identification field of the second device, if the cache information of the second device does not exist in the local database.

Herein, the service identification field is used to identify a report and descriptor information of each service in all services provided by the second device.

Herein, caching a file can be understood as that the system looks for a file in the temporary folder first when an application needs to access the file, and the file is used directly if it is found, otherwise the file is read from the hard disk.

In an example, it is first checked whether the current database has the cache information (database cache) of the device when a connection callback event is received from a stack. The local cache file/data/misc/Bluetooth/GATT_cache_SmartPen is opened through a file operation when the cache data of the device is empty, the [SmartPen] field is added in this file compared with the cache file gatt_cache_XXXXXXXX (XXXXXX is the specific MAC address of the device) generated after system pairing connection. The content after the [SmartPen] field is discovered directly when loading a file, the local data is loaded and the storage information of the related device therein is read, so as to use in the subsequent process. There is no need to find the corresponding file according to the MAC address of the device for a file operation, and there is also no need to trigger the discovering process to discover which functional service is supported by the device side.

The version number of the device information stored before pairing is obtained through the persistent Bluetooth specification ("persist.bluetooth.spechid") before the operation of loading the local cache file, and is compared with that of the current device, the local information is loaded continuously if they are the same, otherwise the invoker will check whether the return value is empty, and the discovering process is performed continuously if it is empty.

The connection of the HID configuration file can be performed after the pairing process is completed. After the security check is completed, if it is a newly connected device, the local cache file/data/misc/bluedroid/bt_spec_config.conf is loaded through a file operation, the content [XX:XX:XX:XX:XX:XX] (XXXXXX is the specific MAC address of the device) can be added for each device compared with the cache file bt_config.conf generated after system pairing connection, it is necessary to traverse all the content [XX:XX:XX:XX:XX:XX] to find the information under the corresponding device address at the time of loading. The general field [SmartPen] is added in this newly added file, the content after the field [SmartPen] is directly discovered when loading the file and the local data is loaded and the stored information of the related device is read out, it is not necessary to traverse all the stored information according to the MAC address of the device and then perform a file operation to obtain the locally stored information of the second device's HID report (HidReport) and HID descriptor (HidDescriptor).

Similarly, the information version number stored before pairing can be obtained through the persistent Bluetooth specification ("persist.bluetooth.spechid") and compared with the current device before loading the file. The local information is loaded continuously if they are the same, otherwise returning a failure directly. The invoker can check whether the returned value satisfies the requirements, initiate the primary service discovery for the HID service if not satisfied, and return completing of the connection directly if satisfied.

In the embodiments of the present disclosure, the first device is triggered to make pairing connection with the second device, and authentication of the second device is completed based on the acquired device information of the second device. The first device reads the matched service information of the second device from the pre-stored service information for pairing connection. Herein, the first device is triggered from the connection callback event of the protocol stack to read the cache information of the second device from the local database. The pairing connection service information of the second device can be directly read if the local cache file library contains cache information. If there is no cache information, the cache file of the local specific device can be loaded based on the service identification field, and the pairing connection information contained in the cache file of the local specific device can be read for pairing connection.

Through the present disclosure, the interaction processes between the device and the peer device are reduced, the speed of pairing connection is accelerated, and the power consumption of devices during pairing connection is reduced to a certain extent.

Based on the same concept, the embodiment of the present disclosure further provides a pairing connection method applied to a second device.

Hereinafter, the embodiment of the present disclosure will explain the execution process of a pairing connection method applied to a second device involved in the above embodiment.

FIG. 4 is a flowchart of a pairing connection method shown according to an exemplary embodiment. As shown in FIG. 4, the method includes the following steps.

In step S41, in response to determining that the second device is triggered to make pairing connection with a first device, device information of the second device is sent.

In step S42, pairing connection with the first device is performed based on pairing connection service information, the pairing connection service information being read by the first device from pre-stored service information for pairing connection when authentication of the second device is passed.

In an example, the sent second device information is a broadcast message broadcast by the second device, and the broadcast message includes address information and private protocol information of the second device. The private protocol information includes at least one of the following: data content identification, second device identification, and second device version information.

Herein, the data content identification, the second device identification and the second device version information have been described in detail in the above embodiment, and details will not be repeated here.

Herein, as for that the first device reads the pairing connection service information that matches the second device from the pre-stored service information for pairing connection, it has been described in detail in the above embodiments, and details will not be repeated here.

In the embodiments of the present disclosure, the second device is triggered to make the pairing connection with the first device, and send device broadcast information to the first device. After the second device is authenticated, the first device directly invokes the service information matched to the second device from the pre-stored cache file about the connection service information of the second device, and the second device is connected with the first device based on processing the confirmed pairing connection information, to complete the whole pairing connection process. Through the present disclosure, the interaction processes between a device and a peer device is reduced, and the user experience of pairing connection is improved.

Taking the first device as a terminal and the second device as a stylus as an example, the pairing connection method involved in the above embodiments of the present disclosure will be described below.

Figure 5:
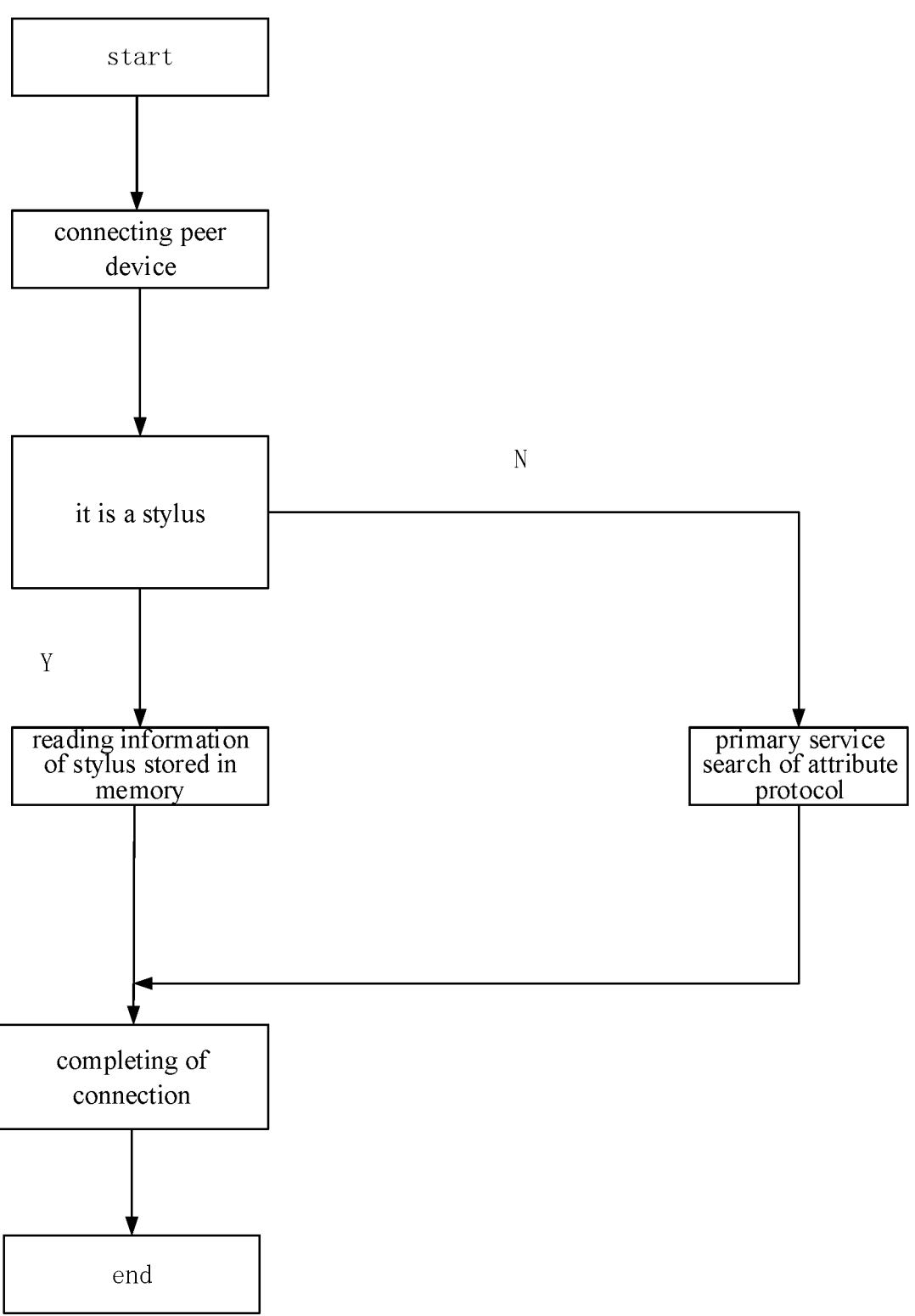
FIG. 5 is a schematic process diagram of a pairing connection method shown according to an exemplary embodiment.

FIG. 5 is a schematic process diagram of a pairing connection method shown according to an exemplary embodiment.

As shown in FIG. 5, the pairing connection can be performed without other operations by the user after the stylus is magnetically attracted to the terminal. The terminal and the stylus begin to pair and connect the peer device. The terminal obtains the stylus information from the stylus broadcast and authenticates whether it is a stylus. If it is not a stylus, the primary discovering service search of the attribute protocol is performed according to the normal procedure, and a connection action is performed after all the supported service information of the peer device is discovered. If it is a stylus, the information of this type of stylus locally stored in the memory is directly read, the local information is used to create connection, confirm completing of the connection, and end the pairing connection.

In the embodiments of the present disclosure, the stylus device that needs to be paired can be acquired first before the terminal and the stylus are paired, and the model, the type and the version number of the device is acquired from the broadcast information of the paired stylus, and it is authenticated whether it is a supported device type. If the authentication is passed, in the process of pairing connection, it is first checked whether there is cache information in the current database when receiving the connection callback event of the protocol stack. The invoking is performed directly if there is cache information; a cache file containing the service identification field of the local specific device is loaded if the cache information is empty, the cache information is read, and it is confirmed that the pairing connection function is supported; otherwise, the discovering service is triggered. The connection of the configuration file can be performed after the pairing process is completed, and the pairing connection service information in the cache file containing the service identification field will be read. The service identification field contains each service report of all services of the stylus and the descriptor information. The terminal and the stylus complete the whole pairing connection process.

Through the present disclosure, the first device can authenticate relevant information of the trusted second device, and the pairing connection service information of the related second device can be read from the cache information about the second device and/or the cache file of the specific device pre-stored by the first device if the authentication is passed, such that it is unnecessary to perform the discovery operation to the peer device when pairing connection is performed for the first time. Therefore, the interaction processes between a device and a peer device are reduced, the speed of the first pairing connection is accelerated, and the energy consumption of device during pairing connection is reduced.

Based on the same concept, the embodiments of the present disclosure further provide a pairing connection apparatus.

It can be understood that, in order to realize the above functions, the pairing connection apparatus provided by the embodiments of the present disclosure includes corresponding hardware structures and/or software modules for executing the respective functions. In combination with the units and algorithm steps of the respective examples disclosed in the embodiments of the present disclosure, the embodiments of the present disclosure can be implemented in the form of hardware or a combination of hardware and computer software. As for whether a certain function is performed by hardware or in the manner of computer software driving hardware, it depends on the specific application and design constraint of the technical solutions. Those skilled in the art can use different methods to realize the described functions for each specific application, but this realization should not be considered as beyond the scope of the technical solutions of the embodiments of the present disclosure.

Figure 6:
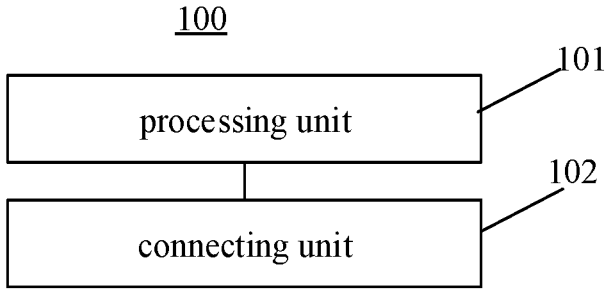
FIG. 6 is a block diagram of a pairing connection apparatus shown according to an exemplary embodiment.

FIG. 6 is a block diagram of a pairing connection apparatus 100 according to an exemplary embodiment. Referring to FIG. 6, the apparatus 100 includes a processing unit 101, and connecting unit 102.

Herein, the processing unit 101 is configured to, in response to determining that the first device is triggered to make a pairing connection with a second device, acquire device information of the second device, and authenticate the second device based on the device information of the second device; and in response to that authentication of the second device is passed, read pairing connection service information that matches the second device from pre-stored service information for pairing connection.

The connecting unit 102 is configured to perform the pairing connection with the second device based on the pairing connection service information.

In an example, the processing unit 101 is configured to acquire device information of the second device, and authenticate the second device based on the device information of the second device by: acquiring a broadcast message broadcast by the second device, the broadcast message including address information and private protocol information of the second device; scanning the second device based on the address information of the second device; in response to having scanned the second device based on the address information of the second device, parsing the private protocol information; and determining consistency between information content obtained by parsing the private protocol information and information content stored in the first device, so as to authenticate the second device.

In an example, the private protocol information includes at least one of the following: data content identification, second device identification, and the second device version information.

In an example, the processing unit 101 is configured to read pairing connection service information that matches the second device from pre-stored service information for pairing connection by: triggering, based on a connection callback event of a protocol stack, to read cache information of the second device from a local database, the cache information being used to cache the pairing connection service information of the second device; if the cache information of the second device exists in the local database, reading the pairing connection service information of the second device from the local database; and if the cache information of the second device does not exist in the local database, loading a cache file that includes a service identification field of the second device, and reading the pairing connection service information of the second device from the cache file based on the service identification field of the second device.

In an example, the service identification field is used to identify a report and descriptor information of each service in all services provided by the second device.

In an example, the first device is a terminal, and the second device is a stylus.

Figure 7:
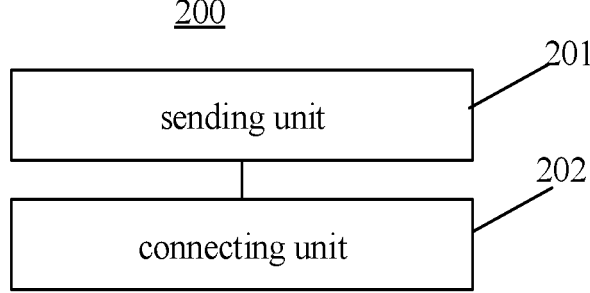
FIG. 7 is a block diagram of a pairing connection apparatus shown according to an exemplary embodiment.

FIG. 7 is a block diagram of a pairing connection apparatus 200 according to an exemplary embodiment. Referring to FIG. 7, the apparatus includes a sending unit 201 and a connecting unit 202.

Herein, the sending unit 201 is configured to, in response to determining that the second device is triggered to make pairing connection with a first device, send device information of the second device.

The connecting unit 202 is configured to perform pairing connection with the first device based on pairing connection service information, the pairing connection service information being read by the first device from pre-stored service information for pairing connection when authentication of the second device is passed.

In an example, the sending unit 201 is configured to send device information of the second device by: broadcasting a broadcast message, the broadcast message including address information and private protocol information of the second device; the address information is used for the first device to scan to the second device, and the private protocol information is used for the first device to authenticate the second device based on consistency between information content obtained by parsing the private protocol information and information content stored in the first device.

In an example, the private protocol information includes at least one of the following: data content identification, the second device identification, and second device version information.

In an example, the pre-stored service information for pairing connection is stored in cache information of a local database of the first device, and the cache information is used to cache the pairing connection service information of the second device; or the pre-stored service information for pairing connection is stored in a cache file, and the cache file includes a service identification field of the second device, and the service identification field of the second device is used to identify the pairing connection service information of the second device.

In an example, the service identification field is used to identify a report and descriptor information of each service in all services provided by the second device.

The specific manners in which operations are executed by the respective modules in the apparatus of the above embodiments have been described in detail in the embodiments regarding the method, and details will not be repeated herein.

Figure 8:
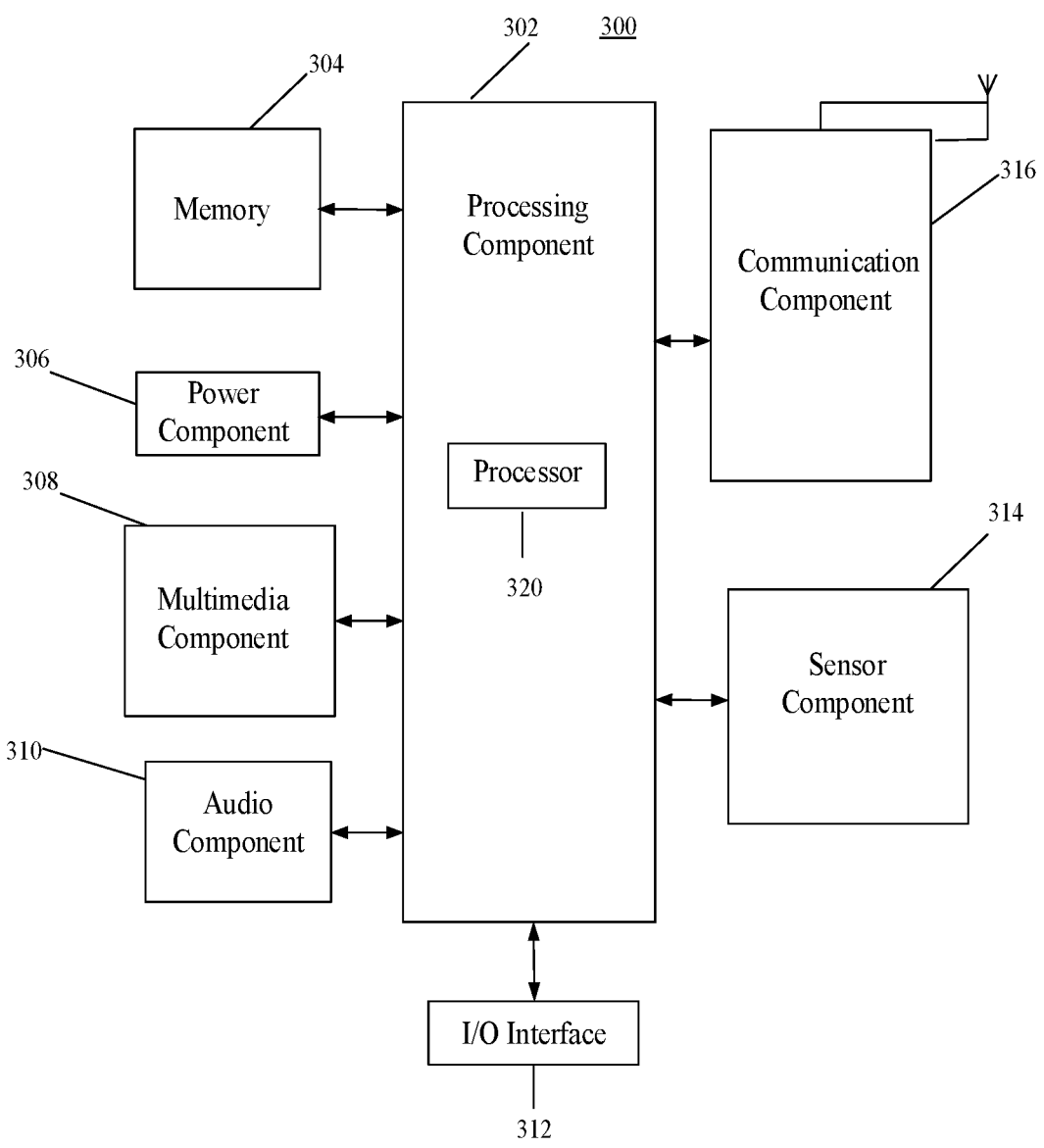
FIG. 8 is a block diagram of a pairing connection apparatus shown according to an exemplary embodiment.

FIG. 8 is a block diagram of a device 300 for pairing connection according to an exemplary embodiment. For example, the device 300 can be a mobile phone, a computer, a digital broadcast terminal, a messaging device, a gaming console, a tablet, a medical device, exercise equipment, a personal digital assistant, and the like.

Referring to FIG. 8, the device 300 can include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 can include one or more processors 320 to execute instructions to perform all or part of the steps in the above described methods. Moreover, the processing component 302 can include one or more modules which facilitate the interaction between the processing component 302 and other components. For instance, the processing component 302 can include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 can include a power management system, one or more power sources, and any other components associated with the generation, management, and distribution of power in the device 300.

The multimedia component 308 includes a screen providing an output interface between the device 300 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 308 includes a front camera and/or a rear camera. The front camera and the rear camera can receive an external multimedia datum while the device 300 is in an operation mode, such as a photographing mode or a video mode. Each of the front camera and the rear camera can be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal can be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons can include, but are not limited to, a home button, a volume button, a starting button, and a locking button.

The sensor component 314 includes one or more sensors to provide status assessments of various aspects of the device 300. For instance, the sensor component 314 can detect an open/closed status of the device 300, relative locating of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 can include a proximity sensor configured to detect the presence of nearby objects without any physical contact. The sensor component 314 can also include a light sensor, such as a CMOS or CCD image sensor, for use in imaging applications. In some embodiments, the sensor component 314 can also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G, 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 300 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is further provided a non-transitory computer-readable storage medium including instructions, such as included in the memory 304, executable by the processor 320 in the device 300, for performing the above described methods. For example, the non-transitory computer-readable storage medium can be a ROM, a RAM, a CD-ROM, a magnetic tape, a floppy disc, an optical data storage device, and the like.

Figure 9:
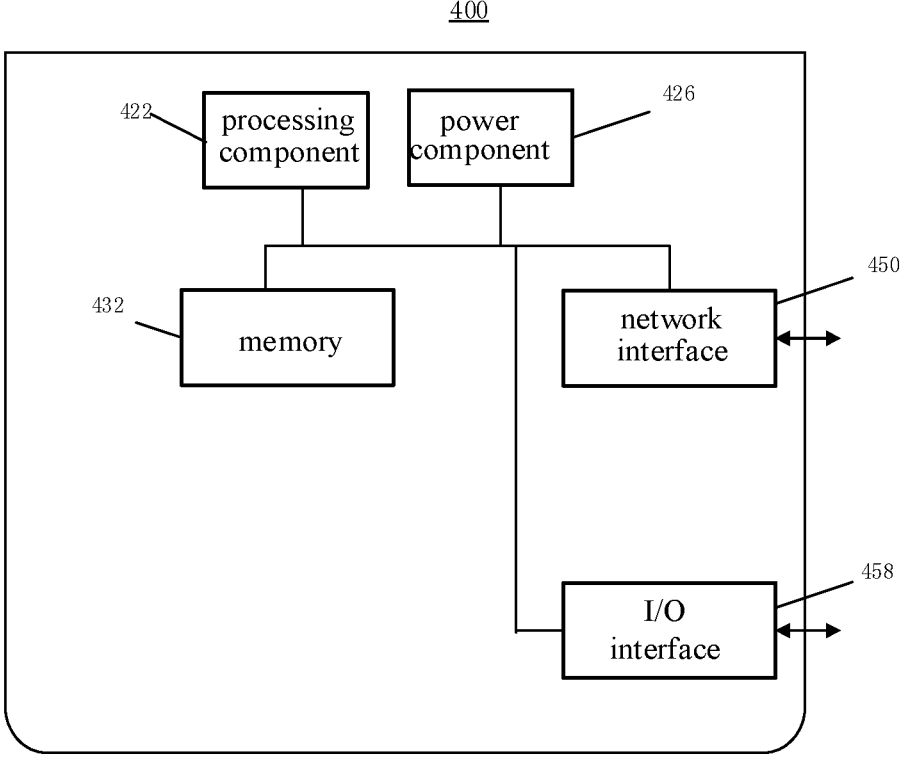
FIG. 9 is a block diagram of a pairing connection apparatus shown according to an exemplary embodiment.

FIG. 9 is a block diagram of a device 400 for configuring connections according to an exemplary embodiment. For example, the device 400 can be provided as a server. Referring to FIG. 9, the device 400 includes a processing component 422, which further includes one or more processors, and memory resources represented by a memory 432 for storing instructions, such as application programs, executable by the processing component 422. The application program stored in the memory 432 can include one or more modules each corresponding to a set of instructions. Furthermore, the processing component 422 is configured to execute instructions to perform the above-mentioned methods.

The device 400 can further include a power component 426 configured to perform power management of the device 400, a wired or wireless network interface 450 configured to connect the device 400 to a network, and an input/output (I/O) interface 458. The device 400 can operate based on an operating system stored in the memory 432, such as Windows Server™, Mac OS X™, Unix™, Linux™, FreeBSD™ or the like.

The technical solutions provided by embodiments of the present disclosure can achieve the following advantages: through the present disclosure, the first device can authenticate the information of the trusted second device, and the service connection information can be read from the local cache file where the information is pre-stored by the first device after the authentication is passed to perform connection, such that the information of the peer device does not need to be cached during the first pairing connection, the interaction process between devices is reduced, and the speed of pairing connection is accelerated. Therefore, the present disclosure solves the problems of slow speed and high power consumption of first connection of pairing connection, and the user experience of pairing connection is improved.

It can be understood that "a plurality of" in the present disclosure refers to two or more, and other quantifiers are similar. The "and/or", which describes the association relationship of related objects, means that there can be three types of relationship, for example, A and/or B can mean three cases that A exists alone, A and B exist together, and B exists alone. The character "/" generally indicates that the associated objects in the context are of an "or" relationship. The singular forms "a/an", "the" and "said" are also intended to include the plural forms, unless the context clearly indicates other meaning.

It can be further understood that the terms "first" and "second" and the like are used to describe various types of information, but these information should not be limited to these terms. These terms are only used to distinguish the same type of information from each other and do not indicate a specific order or importance. In fact, the expressions "first" and "second" and the like can be used interchangeably. For example, without departing from the scope of the present disclosure, the first information can also be referred to as the second information, and similarly, the second information can also be referred to as the first information.

It can be further understood that unless otherwise specified, "connection" includes direct connection between two without other components, and also includes indirect connection between two with other components.

It can be further understood that although the operations are described in a specific order in the drawings in the embodiments of the present disclosure, it should not be understood that these operations are required to be performed in the specific order or in the serial order shown, or all the operations shown are required to be performed to obtain the desired results. In certain circumstances, multitasking and parallel processing can be beneficial.

Other embodiments of the present disclosure can be available to those skilled in the art upon consideration of the specification and practice of the various embodiments disclosed herein. The present application is intended to cover any variations, uses, or adaptations of the present disclosure following general principles of the present disclosure and including the common general knowledge or conventional technical means in the art. The specification and embodiments can be shown as illustrative only, and the true scope of the present disclosure is indicated by the following claims.

It will be understood that the present disclosure is not limited to the exact construction that has been described above and illustrated in the accompanying drawings, and that various modifications and changes can be made without departing from the scope thereof. It is intended that the scope of the present disclosure is limited only by the appended claims.

What is claimed is:

1. A pairing connection method, applied to a first device, the method comprising:

in response to determining that the first device is triggered to make a pairing connection with a second device, acquiring device information of the second device, and authenticating the second device based on the device information of the second device;

in response to that authentication of the second device is passed, obtaining pairing connection service information that matches the second device from pre-stored service information for pairing connection; and pairing with the second device based on the pairing connection service information, wherein acquiring device information of the second device, and authenticating the second device based on the device information of the second device comprises:

acquiring a broadcast message broadcast by the second device, the broadcast message comprising address information and private protocol information of the second device;

scanning the second device based on the address information of the second device;

in response to having scanned the second device based on the address information of the second device, parsing the private protocol information; and determining consistency between information content obtained by parsing the private protocol information and information content stored in the first device to authenticate the second device, and wherein the private protocol information comprises at least one of the following:

data content identification, second device identification, and second device version information.

2. The method according to claim 1, wherein obtaining pairing connection service information that matches the second device from pre-stored service information for pairing connection comprises:

triggering, based on a connection callback event of a protocol stack, to obtain cache information of the second device from a local database, the cache information being used to cache the pairing connection service information of the second device;

when the cache information of the second device exists in the local database, obtaining the pairing connection service information of the second device from the local database; and when the cache information of the second device does not exist in the local database, loading a cache file comprising a service identification field of the second device, and obtaining the pairing connection service information of the second device from the cache file based on the service identification field of the second device.

3. The method according to claim 2, wherein the service identification field is used to identify a report and descriptor information of each service in all services provided by the second device.

4. The method according to claim 1, wherein the first device is a terminal, and the second device is a stylus.

5. A non-transitory computer-readable storage medium, having stored thereon instructions, which, when executed by a processor of a first device, enable the first device to execute the method according to claim 1.

6. A pairing connection method, applied to a second device, the method comprising:

in response to determining that the second device is triggered to make pairing connection with a first device, sending device information of the second device; and pairing with the first device based on pairing connection service information, the pairing connection service information being obtain by the first device from pre-stored service information for pairing connection when authentication of the second device is passed, wherein sending device information of the second device comprises:

broadcasting a broadcast message, the broadcast message comprising address information and private protocol information of the second device; and the address information being used for the first device to scan to the second device, and the private protocol information being used for the first device to authenticate the second device based on consistency between information content obtained by parsing the private protocol information and information content stored in the first device, and wherein the private protocol information comprises at least one of the following:

data content identification, second device identification, and second device version information.

7. The method according to claim 6, wherein the pre-stored service information for pairing connection is stored in cache information of a local database of the first device, and the cache information is used to cache the pairing connection service information of the second device; or the pre-stored service information for pairing connection is stored in a cache file, and the cache file comprises a service identification field of the second device, and the service identification field of the second device is used to identify the pairing connection service information of the second device.

8. The method according to claim 7, wherein the service identification field is used to identify a report and descriptor information of each service in all services provided by the second device.

9. A pairing connection apparatus, comprising:

a processor;

a memory for storing instructions executable by the processor;

wherein the processor is configured to implement the method according to claim 6.

10. The apparatus according to claim 9, wherein the pre-stored service information for pairing connection is stored in cache information of a local database of the first device, and the cache information is used to cache the pairing connection service information of the second device; or the pre-stored service information for pairing connection is stored in a cache file, and the cache file comprises a service identification field of the second device, and the service identification field of the second device is used to identify the pairing connection service information of the second device.

11. A non-transitory computer-readable storage medium, having stored thereon instructions, which, when executed by a processor of a second device, enable the second device to execute the method according to claim 6.

12. A pairing connection apparatus, comprising:

a processor;

a memory for storing instructions executable by the processor;

wherein the processor is configured to perform:

in response to determining that the first device is triggered to make a pairing connection with a second device, acquiring device information of the second device, and authenticating the second device based on the device information of the second device;

in response to that authentication of the second device is passed, obtaining pairing connection service information that matches the second device from pre-stored service information for pairing connection; and pairing with the second device based on the pairing connection service information, wherein the processor is further configured to:

acquire a broadcast message broadcast by the second device, the broadcast message comprising address information and private protocol information of the second device;

scan the second device based on the address information of the second device;

in response to having scanned the second device based on the address information of the second device, parse the private protocol information; and determine consistency between information content obtained by parsing the private protocol information and information content stored in the first device to authenticate the second device, and wherein the private protocol information comprises at least one of the following:

data content identification, second device identification, and second device version information.

13. The apparatus according to claim 12, wherein the processor is further configured to perform:

triggering, based on a connection callback event of a protocol stack, to obtain cache information of the second device from a local database, the cache information being used to cache the pairing connection service information of the second device;

when the cache information of the second device exists in the local database, obtaining the pairing connection service information of the second device from the local database; and when the cache information of the second device does not exist in the local database, loading a cache file comprising a service identification field of the second device, and obtaining the pairing connection service information of the second device from the cache file based on the service identification field of the second device.

* * * * *